United States Patent

Yamamoto et al.

(10) Patent No.: US 10,115,429 B2
(45) Date of Patent: Oct. 30, 2018

(54) DISK MAGAZINE

(71) Applicant: Panasonic Intellectual Property Management Co., Ltd., Osaka (JP)

(72) Inventors: Yoichi Yamamoto, Osaka (JP); Norikatsu Yoshida, Hyogo (JP); Tomoaki Namekawa, Osaka (JP); Shuji Tabuchi, Okayama (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/838,218

(22) Filed: Dec. 11, 2017

(65) Prior Publication Data

US 2018/0174609 A1 Jun. 21, 2018

(30) Foreign Application Priority Data

Dec. 20, 2016 (JP) .................................. 2016-247024

(51) Int. Cl.
  *G11B 17/26* (2006.01)
  *G11B 17/22* (2006.01)
  *G11B 33/04* (2006.01)

(52) U.S. Cl.
  CPC .......... *G11B 17/221* (2013.01); *G11B 33/045* (2013.01)

(58) Field of Classification Search
  None
  See application file for complete search history.

(56) References Cited

U.S. PATENT DOCUMENTS

| 2001/0028627 | A1* | 10/2001 | Takizawa | G11B 17/021 |
| | | | | 720/619 |
| 2003/0011286 | A1* | 1/2003 | Weisser | G11B 17/0283 |
| | | | | 312/9.1 |
| 2003/0185112 | A1* | 10/2003 | Takizawa | G11B 17/021 |
| | | | | 369/30.77 |
| 2013/0326549 | A1 | 12/2013 | Nishi et al. | |
| 2015/0024161 | A1 | 1/2015 | Higaki et al. | |
| 2017/0194028 | A1* | 7/2017 | Hirose | G11B 23/023 |
| 2018/0144773 | A1* | 5/2018 | Yamamoto | G11B 17/225 |

FOREIGN PATENT DOCUMENTS

| JP | 01-103080 U | 7/1989 |
| JP | 06-251544 A | 9/1994 |
| JP | 2014-013639 A | 1/2014 |

* cited by examiner

*Primary Examiner* — William J Klimowicz
(74) *Attorney, Agent, or Firm* — Renner Otto Boisselle & Sklar, LLP

(57) ABSTRACT

A disk magazine according to the present disclosure is a disk magazine equipped with a resin-made disk tray that houses a plurality of disks in a stacked state and a tray holder that houses the disk tray. An opening is provided on one side surface of the tray holder so that the disk tray can be inserted into and extracted from the opening. A sliding member is mounted to a front wall of the disk tray so as to protrude more upward than a top surface of the disk tray. The front wall serves as a side where the disk tray is inserted into the opening. The sliding member is constituted of a resin material different from a resin material that constitutes the disk tray.

9 Claims, 8 Drawing Sheets

DISK MAGAZINE

BACKGROUND

1. Technical Field

The present disclosure relates to a disk magazine equipped with a disk tray and a tray holder. The disk tray houses a plurality of disks (disk-shaped information storage media, such as compact disks (CDs) or digital versatile disks (DVDs)) in a stacked state. The tray holder houses the disk tray.

2. Description of the Related Art

In recent years, a disk apparatus that supplies a disk to each of a plurality of disk drives has been developed. For example, an apparatus described in PTL 1 (Unexamined Japanese Patent Publication No. 2014-13639) is known as this kind of disk apparatus. FIG. 10 is a perspective view schematically showing a configuration of a conventional disk apparatus.

The conventional disk apparatus includes two magazine stockers 101 that extend in apparatus depth direction X1. Two magazine stockers 101 are provided on bottom chassis 111 so as to face each other in apparatus width direction Y1. It should be noted that illustration of one (front side) magazine stocker 101 is omitted in FIG. 10.

Each magazine stocker 101 houses a plurality of disk magazines (hereinafter referred to as magazines) 102. Each magazine 102 has resin-made disk tray (also referred to as magazine tray) 121 that houses a plurality of disks in a stacked state and a box-shaped tray holder (not shown) that houses disk tray 121. Picker 103 is provided between two magazine stockers 101. Picker 103 draws out disk tray 121 from the tray holder of one magazine 102 selected from among the plurality of magazines 102, and holds disk tray 121.

Picker 103 conveys held disk tray 121 to vicinity of a plurality of disk drives 104 disposed on an apparatus rear side. Picker 103 is integrally provided with lifter 105 that pushes out the plurality of disks from disk tray 121.

Disk drive 104 is a device that records or reproduces information on or from the disk. Further, disk drive 104 is a tray type disk drive that loads the disk by using a tray. The plurality of disk drives 104 is stacked in apparatus height direction Z1, and is disposed adjacent to each of magazine stockers 101 on the apparatus rear side. Carrier 106 is provided between the plurality of disk drives 104 stacked and disposed adjacent to one magazine stocker 101 and the plurality of disk drive 104 stacked and disposed adjacent to other magazine stocker 101.

Carrier 106 holds the plurality of disks pushed out by lifter 105 in a stacked state, separates one disk from the plurality of held disks above the tray ejected from arbitrary disk drive 104, and places the separated disk on the tray.

Electric circuit and power source 107 is provided further on the apparatus rear side of carrier 106 and the plurality of disk drives 104. Electric circuit and power source 107 is provided with a controller that controls operation (a motor or the like) of each device, such as picker 103, disk drive 104, or carrier 106. For example, the controller is connected to a host computer that manages data. Based on an instruction from an operator, the host computer sends a command for the controller to perform operation, such as writing or reading data to specified magazine 102. The controller controls the operation of each device, such as picker 103, disk drive 104, or carrier 106, according to the command.

CITATION LIST

Patent Literature

PTL 1: Unexamined Japanese Patent Publication No. 2014-13639

SUMMARY

In recent years, with an advance of cloud computing, a further increase in data capacity has been demanded in the disk apparatus. It is simply considered that the increase in data capacity can be achieved by increasing a number of magazines and a number of disks housed in the magazines.

However, since it is assumed that the disk apparatus is installed in a limited space, such as a 19-inch rack, an increase in size of the apparatus is not desirable. Accordingly, thinning of the magazine, such as further reduction of a gap between the disk tray and the tray holder, is considered to reduce an occupancy rate of the magazines to the apparatus.

In a case where the gap between the disk tray and the tray holder is reduced, when the disk tray is inserted into the tray holder, a top surface of the resin-made disk tray slides on a lower surface of a top wall of the tray holder. Then, the top surface of the disk tray can be rubbed, thereby causing powder. When this powder is attached to a data recording area of the disk, data cannot be recorded on and/or reproduced from the disk.

Therefore, the conventional disk magazine has still room for improvement from a viewpoint of suppressing the attachment of foreign matter, such as powder, to the data recording area of the disk.

The present disclosure is made to solve the above-described problem, and an object of the present disclosure is to provide a disk magazine capable of suppressing attachment of foreign matter to a data recording area of a disk.

A disk magazine in the present disclosure includes: a resin-made disk tray that houses a plurality of disks in a stacked state; and a tray holder that houses the disk tray, wherein an opening is provided on one side surface of the tray holder so that the disk tray can be inserted into and extracted from the opening, a sliding member is mounted to a front wall of the disk tray so as to protrude more upward than a top surface of the disk tray, the front wall serving as a side where the disk tray is inserted into the opening, and the sliding member is constituted of a resin material different from a resin material that constitutes the disk tray.

According to the disk magazine in the present disclosure, attachment of foreign matter to a data recording area of a disk can be suppressed.

DETAILED DESCRIPTION

Figure 1:
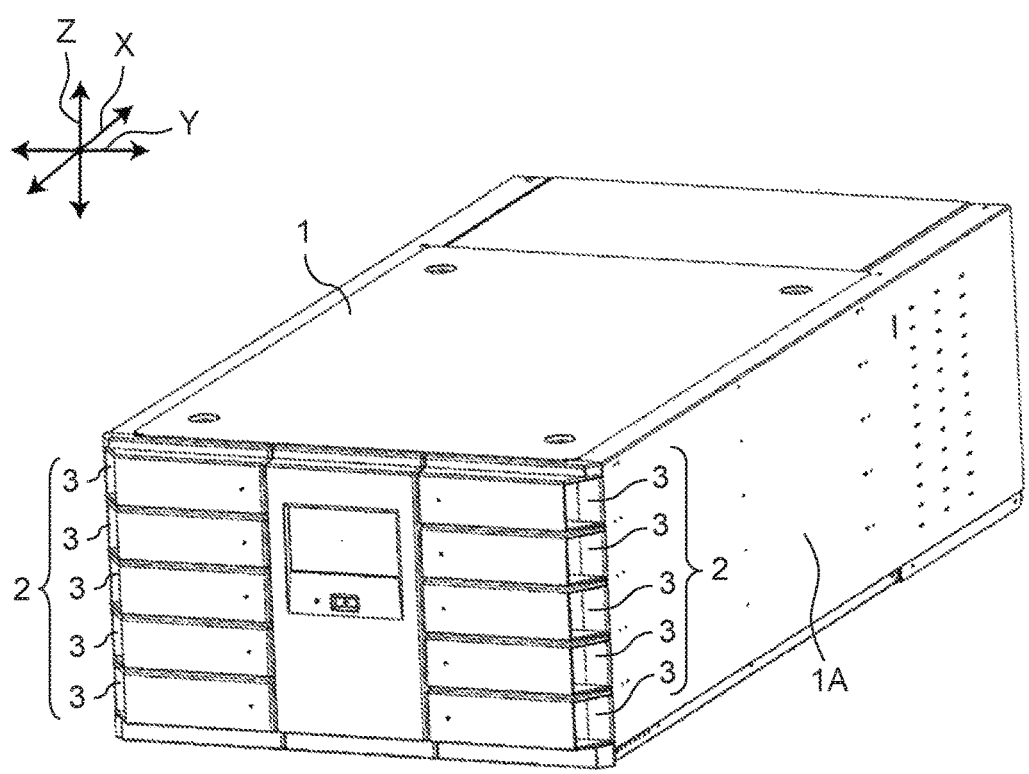
FIG. 1 is a perspective view showing an appearance of a disk apparatus according to an exemplary embodiment.

Underlying Knowledge Forming Basis of the Present Disclosure

In order to suppress attachment of foreign matter to a data recording area of a disk, the inventors of the present disclosure have acquired the following new knowledge as a result of earnest investigation.

First, as a method for suppressing occurrence of the powder, it is simply considered that grease is applied to a portion where a disk tray and a tray holder slide on each other. However, in this case, the grease may be attached to a lower surface of a top wall of the tray holder and transferred to a data recording area of a disk. Particularly, in a case where a double-sided disk having a data recording area on each principal surface is used as the disk to increase data capacity, it is highly possible that the grease is transferred to the data recording area of the disk. Therefore, attachment of foreign matter to the data recording area of the disk cannot be suppressed in this method.

Further, as the method for suppressing occurrence of the powder, it is considered that the disk tray is constituted of a resin material having a high sliding property. However, the sliding property and rigidity of the resin material are generally in a trade-off relation. As mentioned above, thinning of the magazine is demanded. Further, it is demanded that a wall of the disk tray is also thinned as much as possible. Accordingly, strength of the disk tray cannot be sufficiently secured by thickening the wall of the disk tray. Therefore, a material having high rigidity needs to be used for the disk tray.

Thus, as a result of earnest investigation, the inventors of the present disclosure have found a configuration in which a sliding member constituted of a resin material different from a resin material that constitutes a disk tray is mounted to a front wall of the disk tray such that the sliding member protrudes more upward than a top surface of the disk tray. With this configuration, since the sliding member is mounted so as to protrude more upward than the top surface of the disk tray, when the disk tray is inserted into a tray holder, the sliding member is brought into contact with the tray holder ahead of the top surface of the disk tray. Further, since the sliding member is mounted to the front wall of the disk tray, the sliding member can suppress contact between a lower surface of a top wall of the tray holder and the top surface of the disk tray during insertion of the disk tray into the tray holder. Further, since the sliding member is constituted of the resin material different from the resin material that constitutes the disk tray, the resin materials suitable for the respective members can be used. For example, while the resin material having high rigidity can be used for the disk tray, the resin material having a high sliding property can be used for the sliding member.

Based on such new knowledge, the inventors of the present disclosure have arrived at the following disclosure.

According to a first aspect of the present disclosure, a disk magazine includes: a resin-made disk tray that houses a plurality of disks in a stacked state; and a tray holder that houses the disk tray, wherein an opening is provided on one side surface of the tray holder so that the disk tray can be inserted into and extracted from the opening, a sliding member is mounted to a front wall of the disk tray so as to protrude more upward than a top surface of the disk tray, the front wall serving as a side where the disk tray is inserted into the opening, and the sliding member is constituted of a resin material different from the resin material that constitutes the disk tray.

A second aspect of the present disclosure provides the disk magazine according to the first aspect, wherein the sliding member is constituted of a resin material having a sliding property higher than a sliding property of the resin material that constitutes the disk tray.

A third aspect of the present disclosure provides the disk magazine according to the first or second aspect, wherein a height from a lower surface of the disk tray to an apex of the sliding member is lower than a height of an interior space of the tray holder.

A fourth aspect of the present disclosure provides the disk magazine according to any one of the first to third aspects, wherein inclined surfaces are formed on a lower surface of a top wall of the tray holder, and the inclined surfaces are inclined upward toward an outer periphery from a center that faces center holes of the plurality of disks, and a maximum height of a gap between the apex of the sliding member and the lower surface of the top wall of the tray holder is shorter than a minimum height of a gap between the lower surface of the top wall of the tray holder and the top surface of the disk tray.

A fifth aspect of the present disclosure provides the disk magazine according to any one of the first to fourth aspects, wherein the apex of the sliding member is formed in a hemispherical shape or a substantially hemispherical shape.

A sixth aspect of the present disclosure provides the disk magazine according to any one of the first to fifth aspects, wherein a plurality of the sliding members is mounted to symmetrical positions with respect to a center in a width direction of the disk tray.

A seventh aspect of the present disclosure provides the disk magazine according to any one of the first to sixth aspects, wherein a core rod is mounted to a bottom wall of the disk tray so as to penetrate the respective center holes of the plurality of disks housed in the disk tray, and an apex of the core rod protrudes more upward than the top surface of the disk tray, and is constituted of a resin material different from the resin material that constitutes the disk tray.

An eighth aspect of the present disclosure provides the disk magazine according to the seventh aspect, wherein the apex of the core rod is constituted of a resin material having a sliding property higher than a sliding property of the resin material that constitutes the disk tray.

A ninth aspect of the present disclosure provides the disk magazine according to the seventh or eighth aspect, wherein a height from the lower surface of the disk tray to the apex of the core rod is lower than the height of the interior space of the tray holder.

Hereinafter, an exemplary embodiment will be described in detail with reference to the drawings as appropriate. However, a detailed description more than necessary may be omitted. For example, detailed descriptions of already well-known items and repeated descriptions for substantially the same components will be omitted. The reason is to prevent the following description from being unnecessarily redundant and facilitate those skilled in the art to understand.

It is noted that the inventors of the present disclosure provide attached drawings and the following description for those skilled in the art to fully understand the present disclosure, and do not intend to limit the subject matter as described in the appended claims.

Further, hereinafter, for convenience of explanation, a term indicating a direction, such as "upper", "lower", "bottom", "top", "front", or "rear", is used on an assumption of a state in ordinary use. However, it does not mean to limit a usage state or the like of a disk magazine in the present disclosure.

Exemplary Embodiment

FIG. 1 is a perspective view showing an appearance of a disk apparatus according to an exemplary embodiment.

Disk apparatus 1 according to the exemplary embodiment includes two magazine stockers 2. Two magazine stockers 2 are provided so as to face each other in apparatus width direction Y. Each magazine stocker 2 includes a plurality of magazine units 3 stacked and disposed in apparatus height direction Z that is perpendicular to or substantially perpendicular to apparatus width direction Y.

Figure 2:
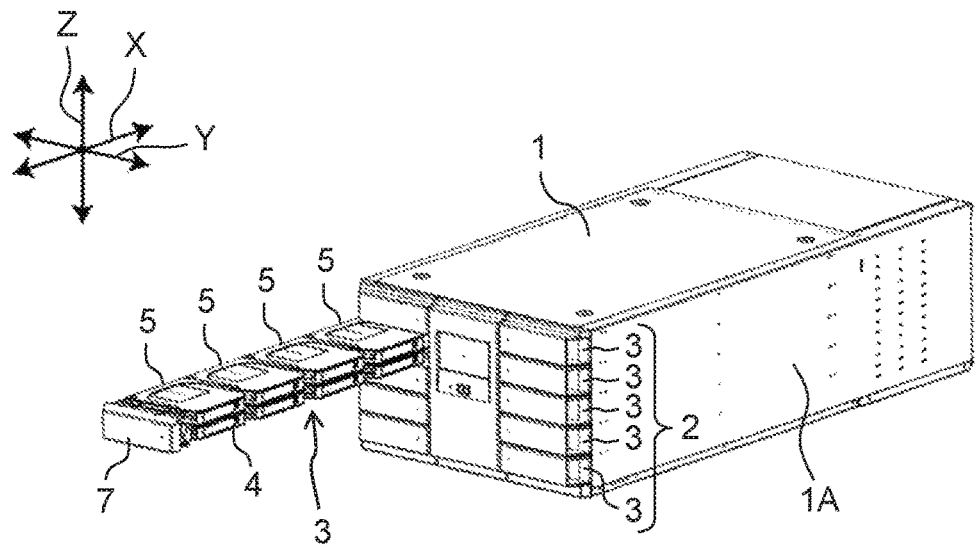
FIG. 2 is a perspective view showing a state in which one magazine unit is drawn out from the disk apparatus in FIG. 1.
Figure 3:
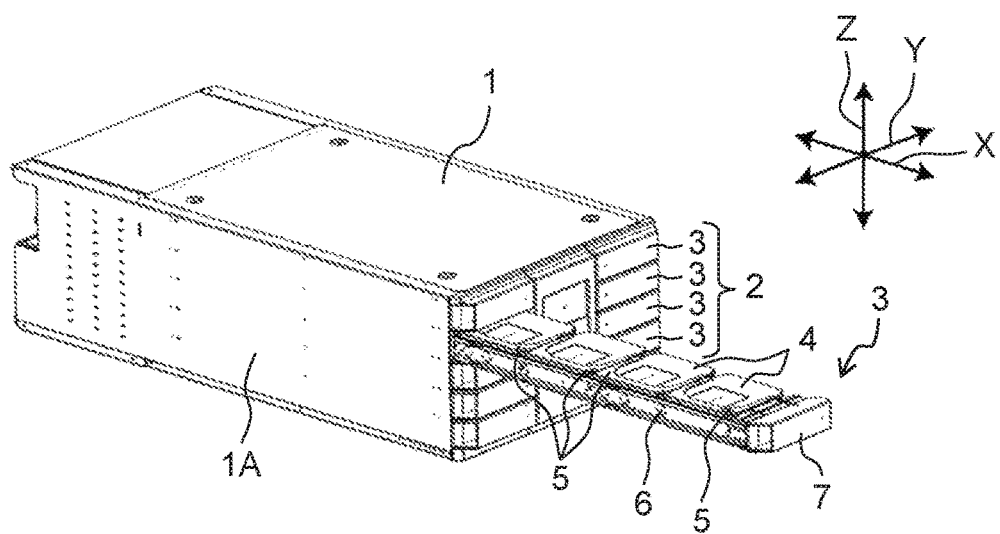
FIG. 3 is a perspective view showing the state in which the one magazine unit is drawn out from the disk apparatus in FIG. 1.

FIGS. 2 and 3 are perspective views showing a state in which one magazine unit 3 is drawn out from disk apparatus 1. As shown in FIG. 2 or 3, magazine unit 3 includes a plurality of magazine holders 5 and rail 6. Each of magazine holders 5 houses magazine 4. Rail 6 is provided along a side surface of housing 1A of disk apparatus 1 so that rail 6 is slidable in apparatus depth direction X that is perpendicular to or substantially perpendicular to apparatus width direction Y and apparatus height direction Z. Handle 7 is mounted to a front end (an end on an apparatus front side) of rail 6 so as to extend in apparatus width direction Y.

Magazine 4 houses a plurality of disks. Disk apparatus 1 is provided with a disk supply mechanism (not shown) that supplies a plurality of disks housed in one magazine 4 selected from among a plurality of magazines 4 to each of a plurality of disk drives. It should be noted that a configuration of components other than magazine 4 is not particularly limited and that the other components can adopt various configurations. For example, the other components can adopt a configuration similar to the configuration of the conventional disk apparatus. Accordingly, a detailed description of the configuration of the components other than magazine 4 is omitted herein.

Figure 4:
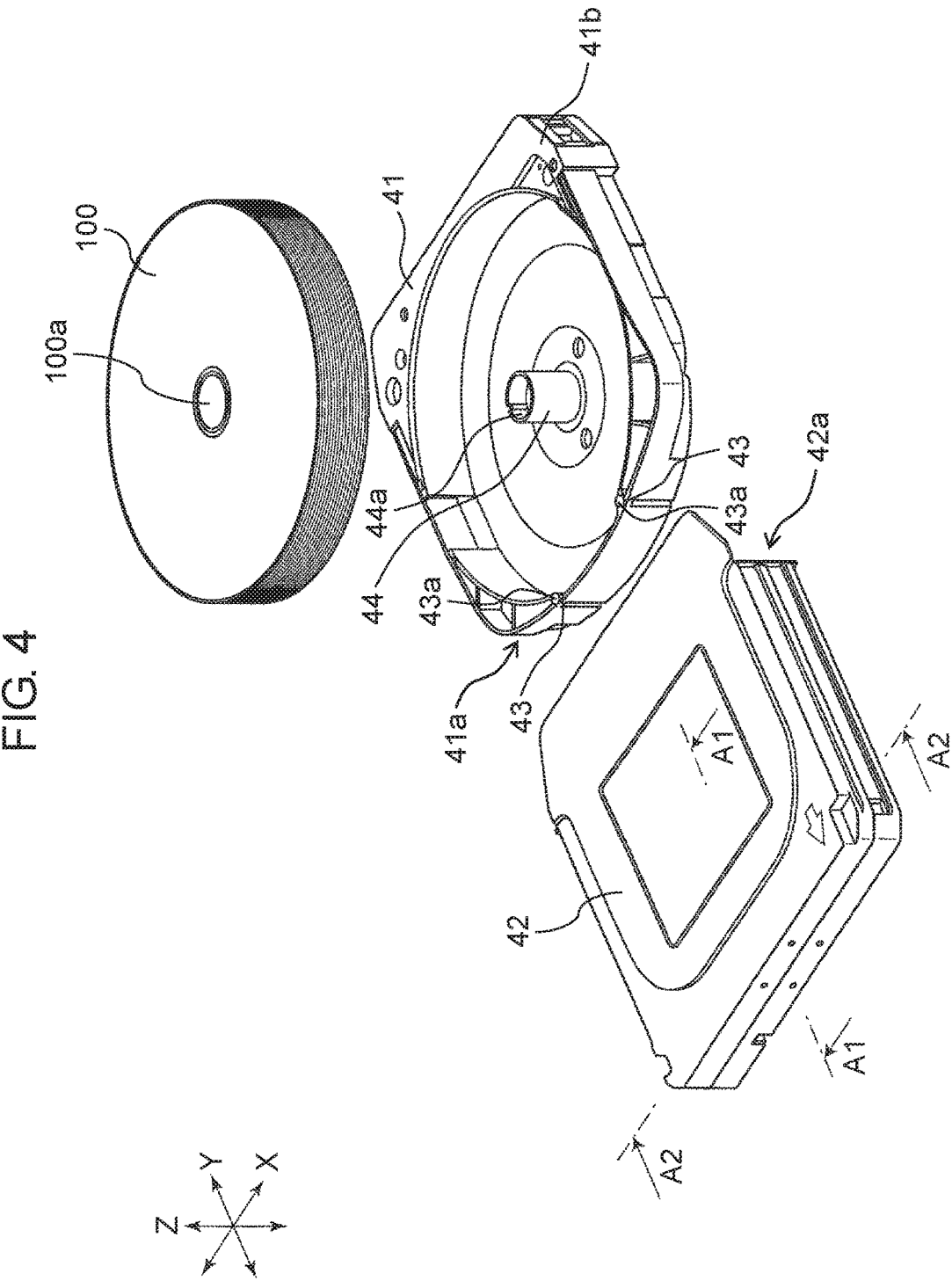
FIG. 4 is an exploded perspective view of a magazine.

FIG. 4 is an exploded perspective view of magazine 4. As shown in FIG. 4, magazine 4 includes resin-made disk tray 41 that houses a plurality of (for example, 10) disks 100 in a stacked state and tray holder 42 that houses disk tray 41. Opening 42a is provided on a front surface (one side surface in direction Y) of tray holder 42. Disk tray 41 can be inserted into and extracted from opening 42a.

Figure 5:
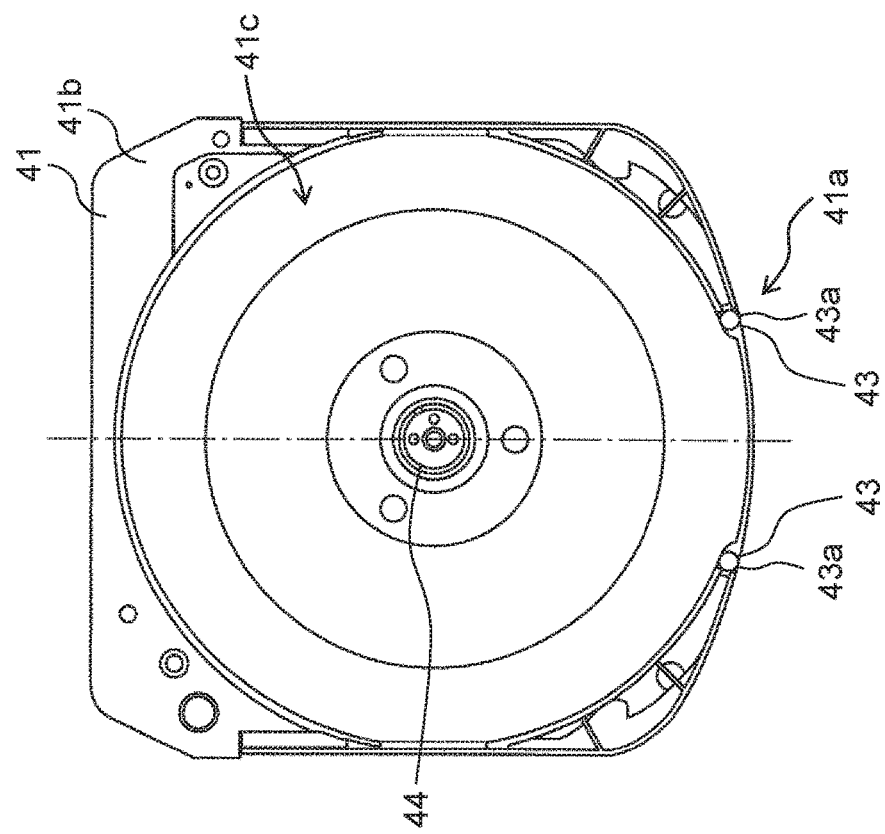
FIG. 5 is a plan view of a disk tray.
Figure 5:
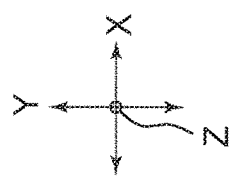

FIG. 5 is a plan view of disk tray 41. As shown in FIG. 5, an outer shape of disk tray 41 is formed substantially rectangular in a planar view. Disk tray 41 houses the plurality of disks 100 in a state in which disks 100 are stacked in close contact with each other. Disk tray 41 is, for example, constituted of a resin material having high rigidity, such as acrylonitrile-butadiene-styrene (ABS) resin. In the exemplary embodiment, each disk 100 is a double-sided disk having a data recording area on each side.

As shown in FIG. 4 or 5, sliding member 43 is mounted to front wall 41a of disk tray 41 so as to protrude more upward than top surface 41b of disk tray 41. The front wall 41a serves as a side where disk tray 41 is inserted into opening 42a. For example, sliding member 43 is pushed into a through-hole (not shown) formed on top surface 41b of disk tray 41 while being elastically deformed. Accordingly, sliding member 43 is mounted. Apex 43a of sliding member 43 that protrudes more upward than top surface 41b of disk tray 41 is formed in a hemispherical shape or a substantially hemispherical shape.

A plurality of sliding members 43 is mounted at symmetrical positions with respect to a center in width direction X of disk tray 41 (a dashed line in FIG. 5). In the exemplary embodiment, two sliding members 43 are mounted at the symmetrical positions with respect to the center in width direction X of disk tray 41.

Further, a height from a lower surface of disk tray 41 to apex 43a of sliding member 43 is lower than a height of an interior space of tray holder 42. In other words, in a state in which disk tray 41 is housed in tray holder 42, apex 43a of sliding member 43 is not in contact with tray holder 42.

Sliding member 43 is constituted of a resin material different from the resin material that constitutes disk tray 41. In the exemplary embodiment, sliding member 43 is constituted of a resin material having a sliding property higher than a sliding property of the resin material that constitutes disk tray 41. For example, sliding member 43 is constituted of a resin material, such as polyacetal (POM), polyamide (PA), or polytetrafluoroethylene (PTFE).

Core rod 44 is mounted to bottom wall 41c of disk tray 41 so as to pass through respective center holes 100a of the plurality of disks 100 housed in disk tray 41. Core rod 44 is inserted into center holes 100a of the plurality of disks 100 to regulate movement of each disk 100 in a surface direction. This core rod 44 prevents scratching of each disk 100 caused by the movement of each disk 100 in the surface direction.

Apex 44a of core rod 44 protrudes more upward than top surface 41b of disk tray 41. A height from the lower surface of disk tray 41 to apex 44a of core rod 44 is lower than the height of the interior space of tray holder 42. In other words, in the state in which disk tray 41 is housed in tray holder 42, apex 44a of core rod 44 is not in contact with tray holder 42.

Apex 44a of core rod 44 is constituted of a resin material different from the resin material that constitutes disk tray 41. In the exemplary embodiment, entire core rod 44 is constituted of a resin material having a sliding property higher than the sliding property of the resin material that constitutes disk tray 41. For example, core rod 44 is constituted of a resin material, such as polyacetal (POM), polyamide (PA), or polytetrafluoroethylene (PTFE).

Figure 6:
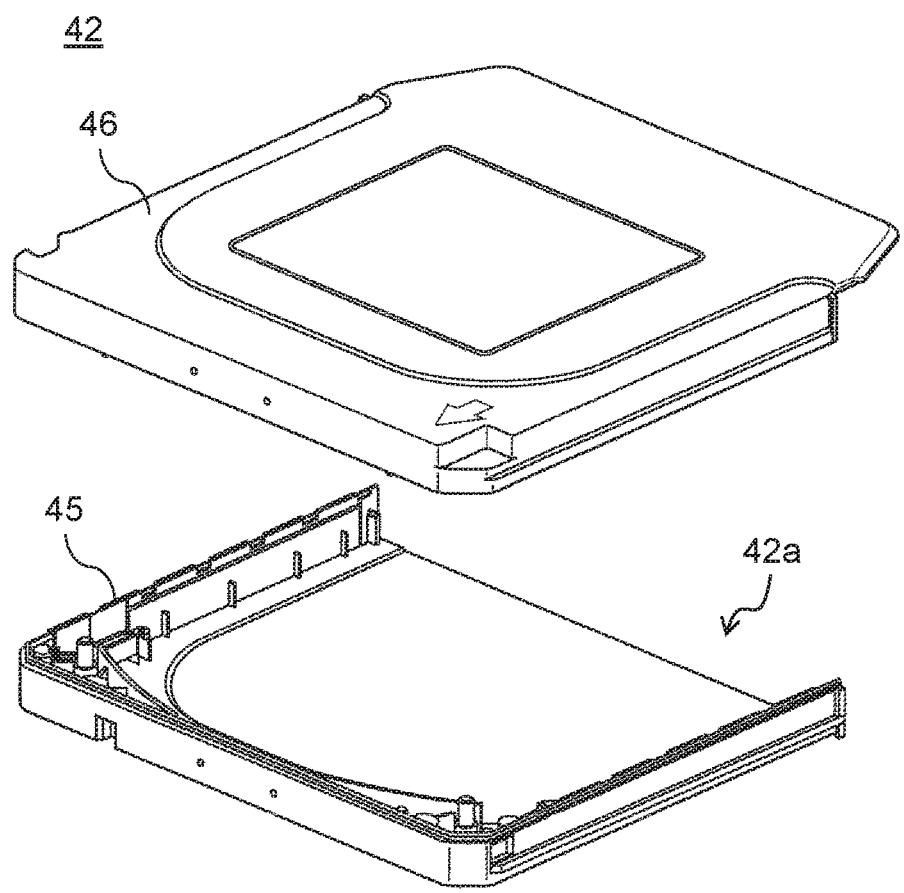
FIG. 6 is an exploded perspective view of a tray holder.

FIG. 6 is an exploded perspective view of tray holder 42. As shown in FIG. 6, tray holder 42 is formed by combining lower holder 45 and upper holder 46. Lower holder 45 constitutes a bottom wall of tray holder 42, on which disk tray 41 is placed. Upper holder 46 constitutes a top wall of tray holder 42 that covers an upper surface of disk 100 housed in disk tray 41.

Figure 7:
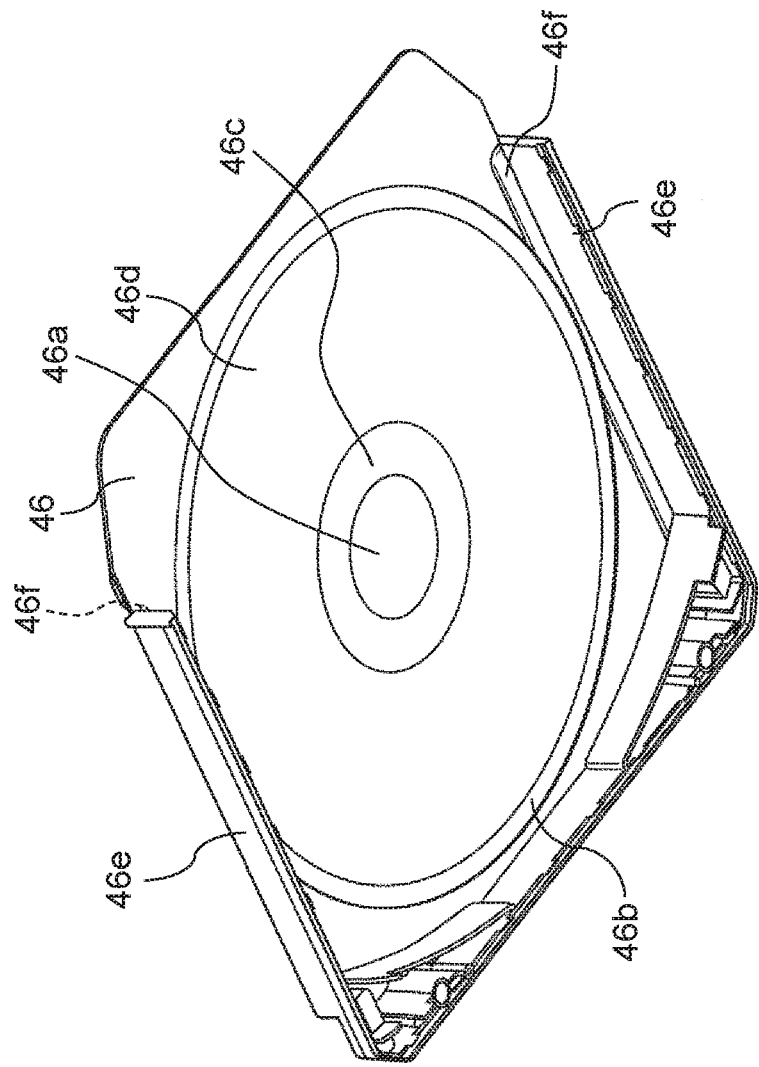
FIG. 7 is a perspective view of an upper holder of the tray holder as seen from diagonally below.
Figure 8:
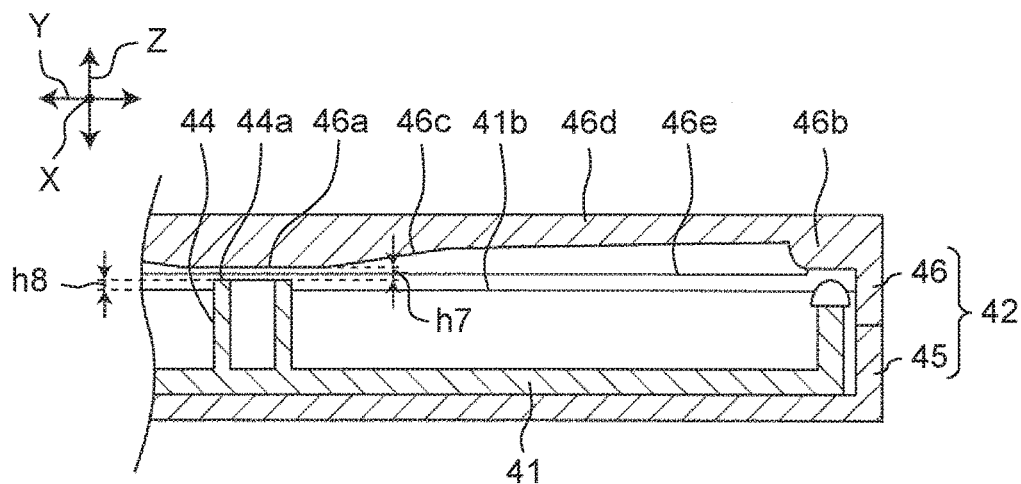
FIG. 8 is a sectional view, taken along line A1-A1 in FIG. 4, showing a state in which the disk tray is housed in the tray holder.
Figure 9:
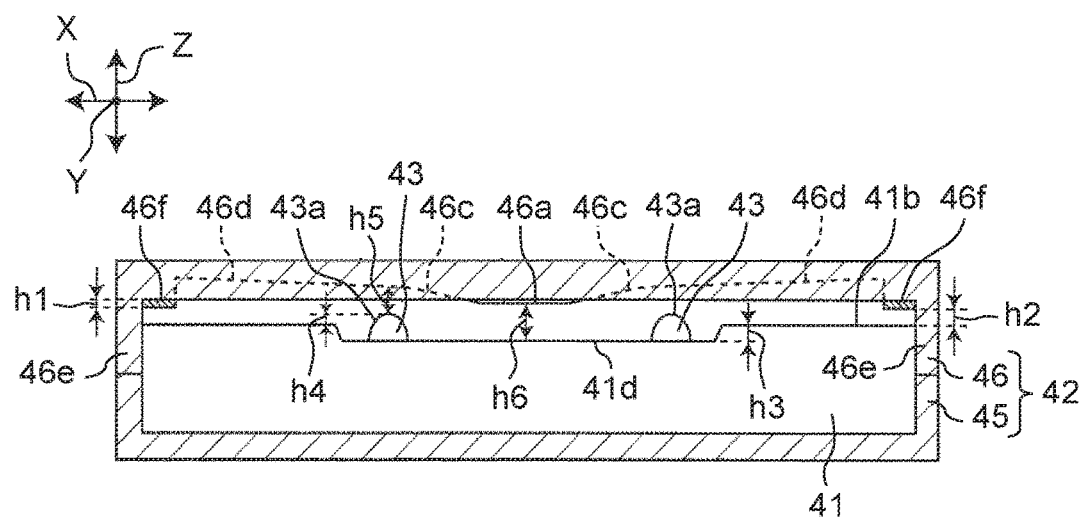
FIG. 9 is a sectional view, taken along line A2-A2 in FIG. 4, showing the state in which the disk tray is housed in the tray holder.
Figure 10:
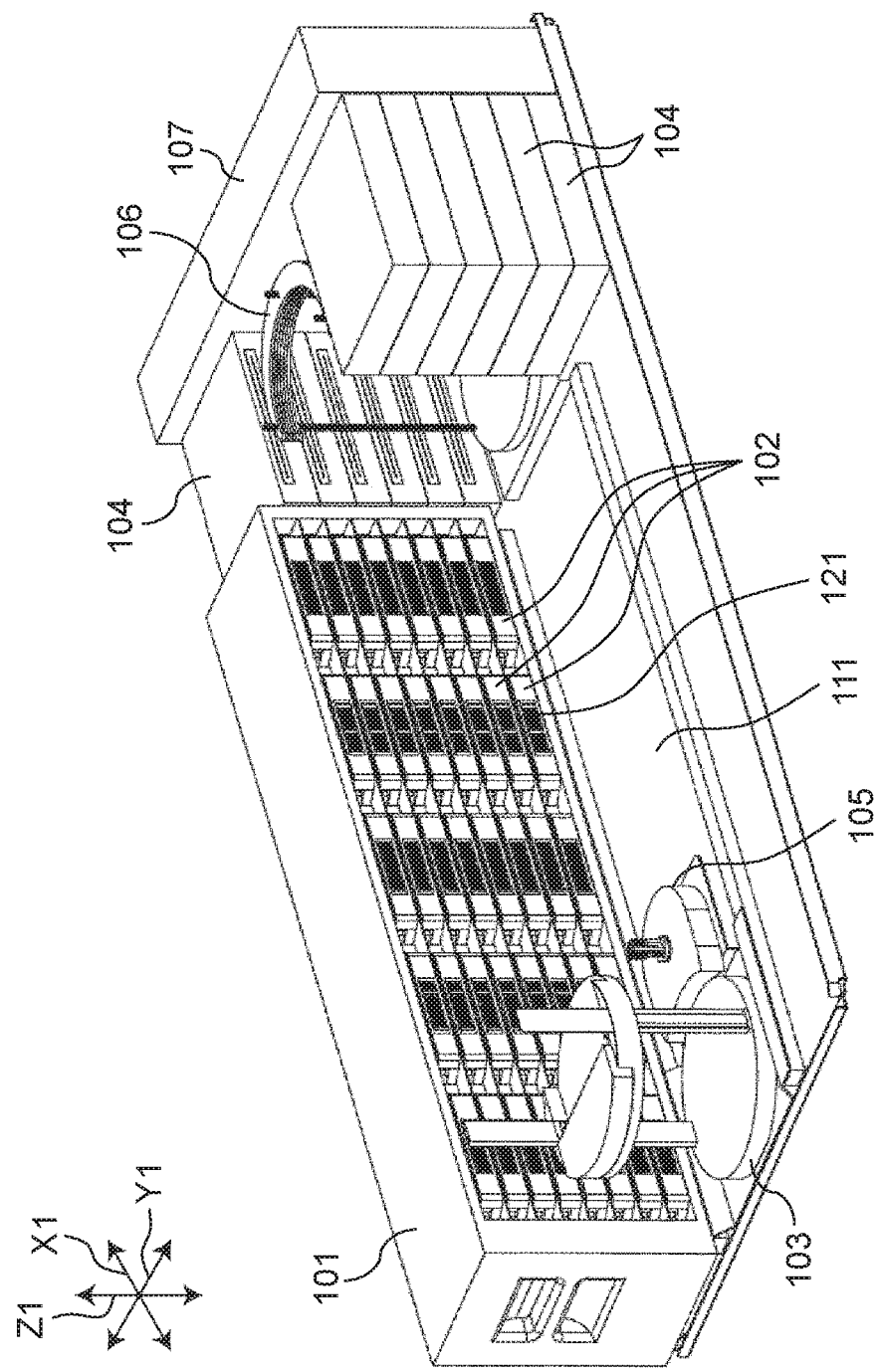
FIG. 10 is a perspective view schematically showing a configuration of a conventional disk apparatus.

FIG. 7 is a perspective view of upper holder 46 as seen from diagonally below. FIG. 8 is a sectional view, taken along line A1-A1 in FIG. 4, showing a state in which disk tray 41 is housed in tray holder 42. FIG. 9 is a sectional view, taken along line A2-A2 in FIG. 4, showing the state in which disk tray 41 is housed in tray holder 42. It should be noted that, in order to facilitate understanding, FIGS. 8 and 9 show an inclination angle, a size, and the like of each member with exaggeration.

As shown in FIGS. 7 to 9, inclined surfaces 46c, 46d are formed on a lower surface of upper holder 46. Inclined surfaces 46c, 46d are inclined upward toward outer periphery 46b from center 46a that faces core rod 44 (center hole 100a of disk 100). In the exemplary embodiment, an inclination angle of inclined surface 46c adjacent to center 46a is greater than an inclination angle of inclined surface 46d adjacent to outer periphery 46b. With this configuration, center 46a of upper holder 46 is formed thicker than other parts.

Further, a pair of guides 46f is provided on the lower surface of upper holder 46 so as to run along each side wall 46e of upper holder 46 (so as to run along direction Y). These guides 46f prevent surface contact between top surface 41b of disk tray 41 and the lower surface of upper holder 46. As shown in FIG. 9, height h1 of each guide 46f is, for example, 125 µm. Height h2 of a gap between each guide 46f and top surface 41b of disk tray 41 is, for example, 200 µm.

Further, as shown in FIG. 9, each sliding member 43 is mounted to cutout 41d cut out by height h3 from top surface 41b of disk tray 41. Height h3 is, for example, 1150 µm (1.15 mm). Further, height h4 of each sliding member 43 that protrudes from top surface 41b of disk tray 41 is, for example, 175 nm. A height of each sliding member 43 is, for example, 1325 nm (=h3+h4).

Since inclined surfaces 46c, 46d are formed on the lower surface of upper holder 46, when disk tray 41 is inserted into tray holder 42, a height of a gap between apex 43a of sliding member 43 and the lower surface of upper holder 46 is displaced. In the exemplary embodiment, height h5 is a maximum height of the gap between apex 43a of sliding member 43 and the lower surface of upper holder 46. Height h5 is set at, for example, 330 µm. Further, height h6 of a gap between center 46a of upper holder 46 and cutout 41d is set at 1400 µm (1.4 mm). In the exemplary embodiment, height h6 is a minimum height of a gap between the lower surface of upper holder 46 and top surface 41b of disk tray 41. Since height h5 is shorter than height h6, when disk tray 41 is inserted into tray holder 42, apex 43a of sliding member 43 is brought into contact with the lower surface of upper holder 46 ahead of top surface 41b of disk tray 41.

Further, as shown in FIG. 8, in the state in which disk tray 41 is housed in tray holder 42, a gap is formed between apex 44a of core rod 44 and center 46a of upper holder 46. Height h7 of the gap is, for example, 125 µm. Further, height h8 of core rod 44 that protrudes from top surface 41b of disk tray 41 is, for example, 125 µm.

According to the exemplary embodiment, sliding member 43 is mounted so as to protrude more upward than top surface 41b of disk tray 41. With this configuration, when disk tray 41 is inserted into tray holder 42, sliding member 43 is brought into contact with tray holder 42 ahead of top surface 41b of disk tray 41. Further, even in a case where disk tray 41 receives vibration in height direction Z in the state in which disk tray 41 is housed in tray holder 42, sliding member 43 is brought into contact with tray holder 42 ahead of top surface 41b of disk tray 41.

Further, according to the exemplary embodiment, sliding member 43 is mounted to front wall 41a of disk tray 41. With this configuration, sliding member 43 can suppress contact between the lower surface of upper holder 46 and top surface 41b of disk tray 41 during insertion of disk tray 41 into tray holder 42.

Further, according to the exemplary embodiment, sliding member 43 is constituted of the resin material different from the resin material that constitutes disk tray 41. With this configuration, the resin materials suitable for the respective components can be used. For example, sliding member 43 is constituted of the resin material that hardly causes powder even when sliding member 43 slides on the lower surface of upper holder 46. Accordingly, attachment of foreign matter, such as the powder, to a data recording area of disk 100 can be suppressed.

Further, according to the exemplary embodiment, sliding member 43 is constituted of the resin material having the sliding property higher than the sliding property of the resin material that constitutes disk tray 41. With this configuration, attachment of the foreign matter, such as the powder, to the data recording area of disk 100 can be further suppressed.

Further, according to the exemplary embodiment, the height from the lower surface of disk tray 41 to apex 43a of sliding member 43 is lower than the height of the interior space of tray holder 42. With this configuration, when disk tray 41 is inserted into tray holder 42, constant contact of sliding member 43 with the lower surface of upper holder 46 can be suppressed. As a result, attachment of the foreign matter, such as the powder, to the data recording area of disk 100 can be further suppressed. Further, a load caused by the contact between sliding member 43 and the lower surface of upper holder 46 can be suppressed.

Further, according to the exemplary embodiment, inclined surfaces 46c, 46d are formed on the lower surface of upper holder 46. Inclined surfaces 46c, 46d are inclined upward toward outer periphery 46b from center 46a that faces center holes 100a of the plurality of disks 100. With this configuration, a space between an uppermost disk of the plurality of disks 100 and the lower surface of upper holder 46 can be widely secured. As a result, even in a case where the foreign matter enters the space, scratching of the uppermost disk by the foreign matter can be suppressed.

Further, according to the exemplary embodiment, maximum height h5 of the gap between apex 43a of sliding member 43 and the lower surface of upper holder 46 is set shorter than minimum height h6 of the gap between the lower surface of upper holder 46 and top surface 41b of disk tray 41. With this configuration, sliding member 43 can suppress contact between the lower surface of upper holder 46 and top surface 41b of disk tray 41 more reliably during insertion of disk tray 41 into tray holder 42.

Further, according to the exemplary embodiment, apex 43a of sliding member 43 is formed in the hemispherical shape or the substantially hemispherical shape. With this configuration, even in the case where apex 43a of sliding member 43 and the lower surface of upper holder 46 are brought into contact with each other, the apex 43a and the lower surface are in point contact. As a result, attachment of the foreign matter, such as the powder, to the data recording area of disk 100 can be further suppressed. Further, the load caused by the contact between sliding member 43 and the lower surface of upper holder 46 can be suppressed.

Further, according to the exemplary embodiment, two sliding members 43 are mounted at the symmetrical positions with respect to the center in width direction X of disk tray 41. Two sliding members 43 can suppress the contact between the lower surface of upper holder 46 and top surface 41b of disk tray 41 more reliably. Further, for example, in a configuration in which front wall 41a is inserted into opening 42a of tray holder 42 by rotating disk tray 41 by 90 degrees, sliding member 43 is brought into contact with tray holder 42 ahead of top surface 41b of disk tray 41, regardless of a rotating direction.

Further, according to the exemplary embodiment, apex 44a of core rod 44 protrudes more upward than top surface 41b of disk tray 41, and core rod 44 is constituted of the resin material different from the resin material that constitutes disk tray 41. With this configuration, apex 44*a* of core rod 44 is constituted of the resin material that hardly causes powder even when apex 44*a* of core rod 44 slides on the lower surface of upper holder 46. Accordingly, attachment of the foreign matter, such as the powder, to the data recording area of disk 100 can be suppressed. Further, since apex 44*a* of core rod 44 protrudes more upward than top surface 41*b* of disk tray 41, even when center 46*a* of upper holder 46 is pressed from outside, contact of the lower surface of upper holder 46 with the uppermost disk can be suppressed.

Further, according to the exemplary embodiment, apex 44*a* of core rod 44 is constituted of the resin material having the sliding property higher than the sliding property of the resin material that constitutes disk tray 41. With this configuration, attachment of the foreign matter, such as the powder, to the data recording area of disk 100 can be further suppressed.

Further, according to the exemplary embodiment, the height from the lower surface of disk tray 41 to apex 44*a* of core rod 44 is lower than the height of the interior space of tray holder 42. With this configuration, when disk tray 41 is inserted into tray holder 42, constant contact of apex 44*a* of core rod 44 with the lower surface of upper holder 46 can be suppressed. As a result, attachment of the foreign matter, such as the powder, to the data recording area of disk 100 can be further suppressed. Further, a load caused by the contact between apex 44*a* of core rod 44 and the lower surface of upper holder 46 can be suppressed.

It should be noted that the present disclosure is not limited to the above exemplary embodiment and can be implemented in various other embodiments. For example, sliding member 43 is mounted only to front wall 41*a* of disk tray 41 in the above exemplary embodiment. However, the present disclosure is not limited to this. For example, sliding member 43 may also be mounted to a side wall or a rear wall of disk tray 41. With this configuration, sliding member 43 can suppress the contact between the lower surface of upper holder 46 and top surface 41*b* of disk tray 41 more reliably.

The exemplary embodiment has been described above as an example of the technique in the present disclosure. The appended drawings and the detailed description have been presented for this purpose. Accordingly, the components described in the appended drawings and the detailed description include not only components essential for solving the problem, but also components that are not essential for solving the problem in order to illustrate the above technique. Therefore, it should not immediately be construed that these components that are not essential are essential because the components are described in the appended drawings and the detailed description.

Since the above exemplary embodiment is intended to exemplify the technique in the present disclosure, it is possible to make various changes, replacements, additions, omissions, or the like within the scope of claims or of their equivalents.

Since the disk magazine according to the present disclosure can suppress attachment of foreign matter to a data recording area of a disk, the disk magazine is particularly useful for a disk apparatus that supplies the disk to each of a plurality of disk drives.

What is claimed is:

1. A disk magazine comprising:
   a disk tray that is made of resin and houses a plurality of disks in a stacked state; and
   a tray holder that houses the disk tray, wherein
   an opening is provided on one side surface of the tray holder so that the disk tray can be inserted into and extracted from the opening,
   a sliding member is mounted to a front wall of the disk tray so as to protrude more upward than a top surface of the disk tray, the front wall serving as a side where the disk tray is inserted into the opening, and
   the sliding member is constituted of a resin material different from the resin material that constitutes the disk tray.

2. The disk magazine according to claim 1, wherein the sliding member is constituted of a resin material having a sliding property higher than a sliding property of the resin material that constitutes the disk tray.

3. The disk magazine according to claim 1, wherein a height from a lower surface of the disk tray to an apex of the sliding member is lower than a height of an interior space of the tray holder.

4. The disk magazine according to claim 1, wherein
   inclined surfaces are formed on a lower surface of a top wall of the tray holder, and the inclined surfaces are inclined upward toward an outer periphery from a center that faces center holes of the plurality of disks, and
   a maximum height of a gap between the apex of the sliding member and the lower surface of the top wall of the tray holder is shorter than a minimum height of a gap between the lower surface of the top wall of the tray holder and the top surface of the disk tray.

5. The disk magazine according to claim 1, wherein the apex of the sliding member is formed in a hemispherical shape or a substantially hemispherical shape.

6. The disk magazine according to claim 1, wherein a plurality of the sliding members is mounted to symmetrical positions with respect to a center in a width direction of the disk tray.

7. The disk magazine according to claim 1, wherein
   a core rod is mounted to a bottom wall of the disk tray so as to pass through the respective center holes of the plurality of disks housed in the disk tray, and
   an apex of the core rod protrudes more upward than the top surface of the disk tray, and is constituted of a resin material different from the resin material that constitutes the disk tray.

8. The disk magazine according to claim 7, wherein the apex of the core rod is constituted of a resin material having a sliding property higher than the sliding property of the resin material that constitutes the disk tray.

9. The disk magazine according to claim 7, wherein a height from the lower surface of the disk tray to the apex of the core rod is lower than the height of the interior space of the tray holder.

* * * * *